2 Sheets--Sheet 1.
H. BAUGHMAN.
Saw-Gummers and Sharpeners.
No.156,473. Patented Nov. 3, 1874.
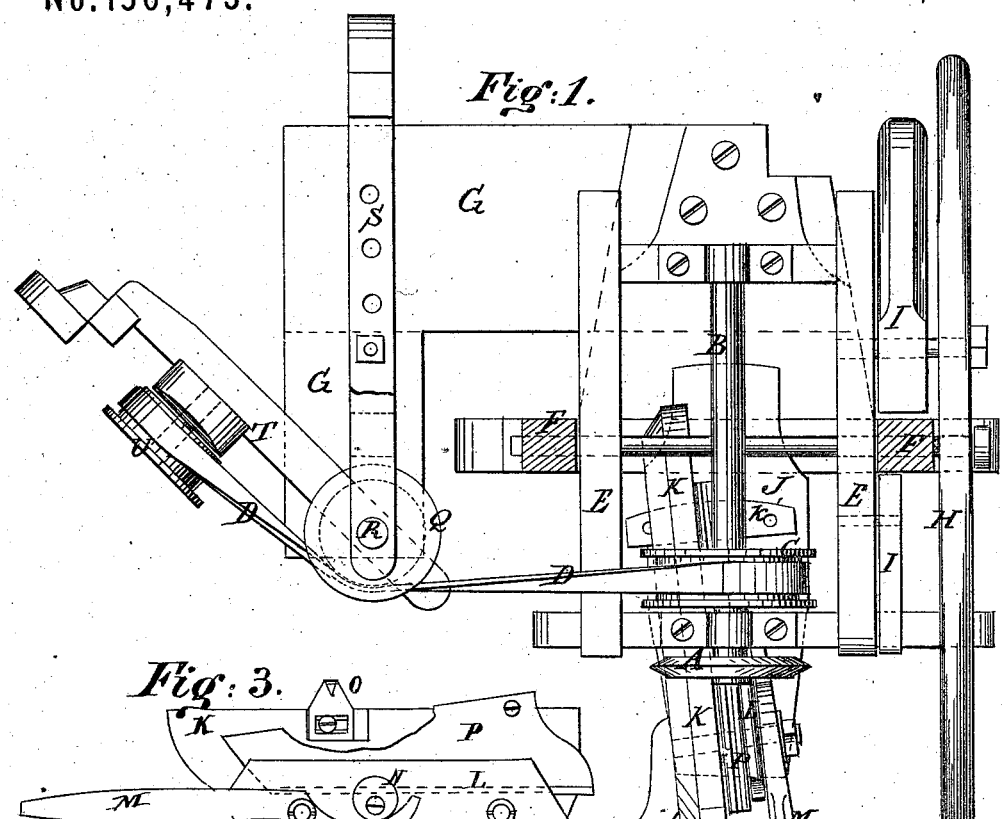
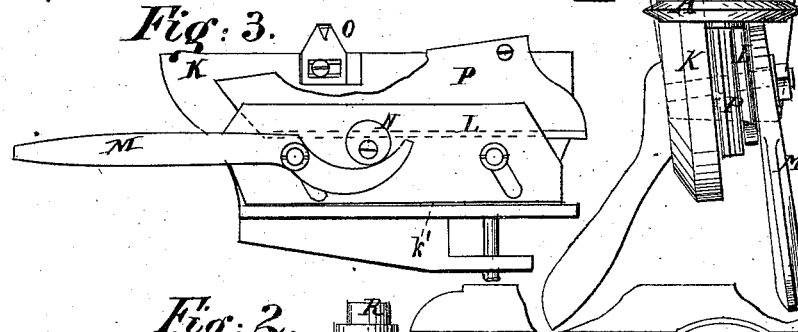
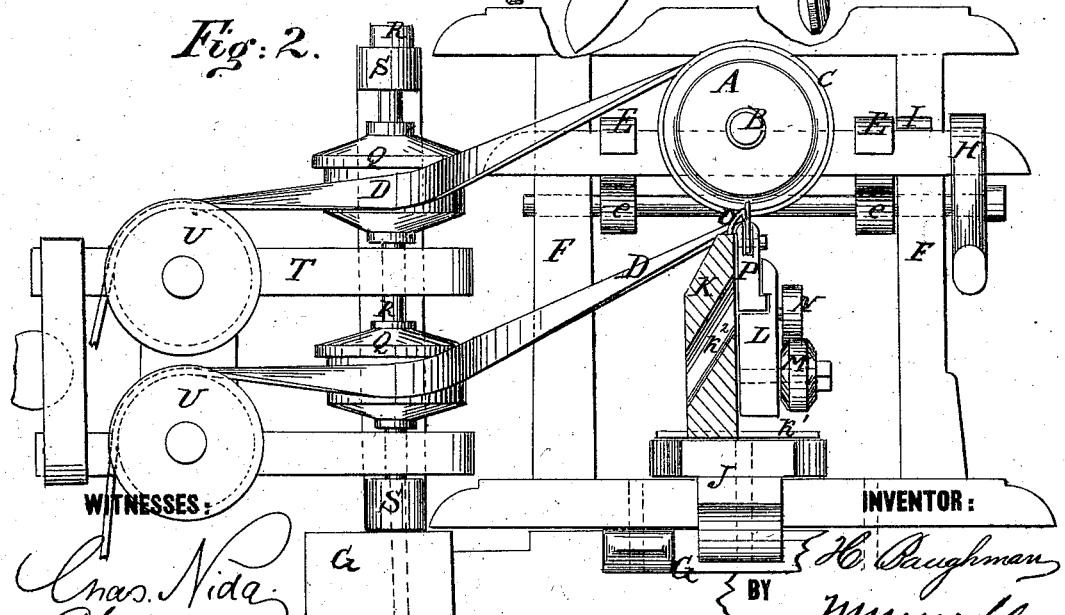

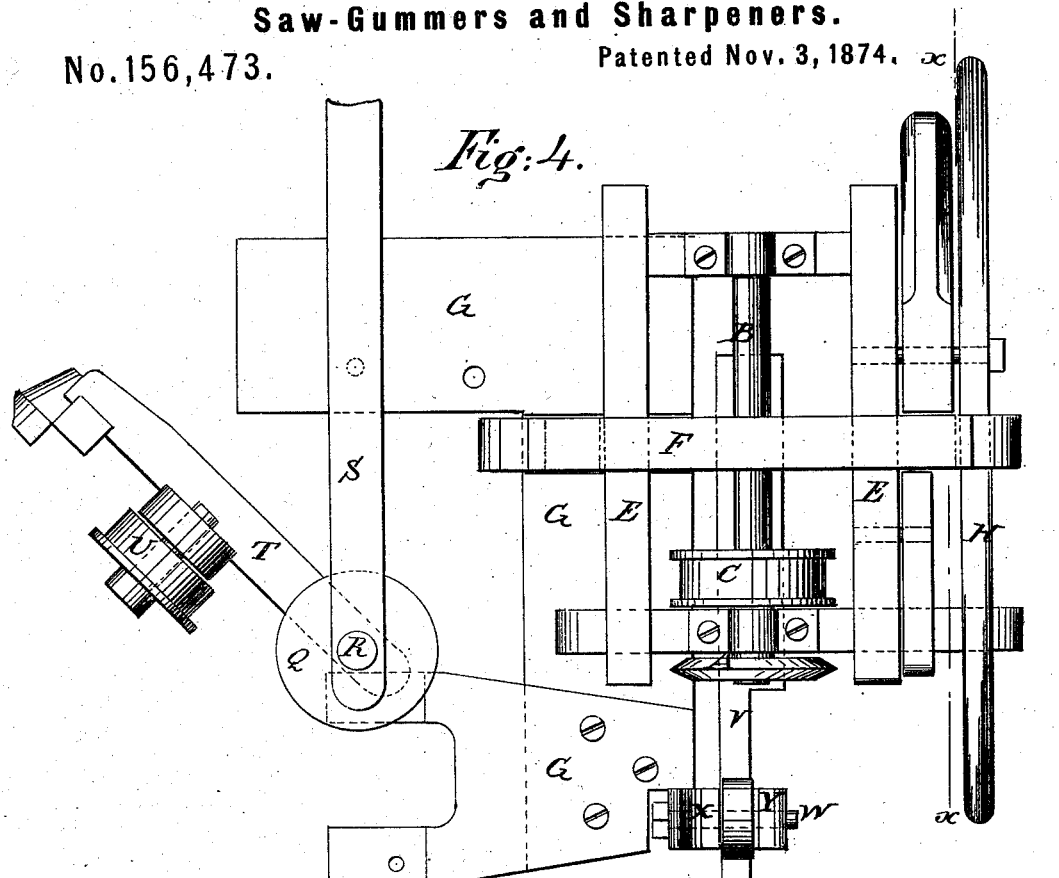
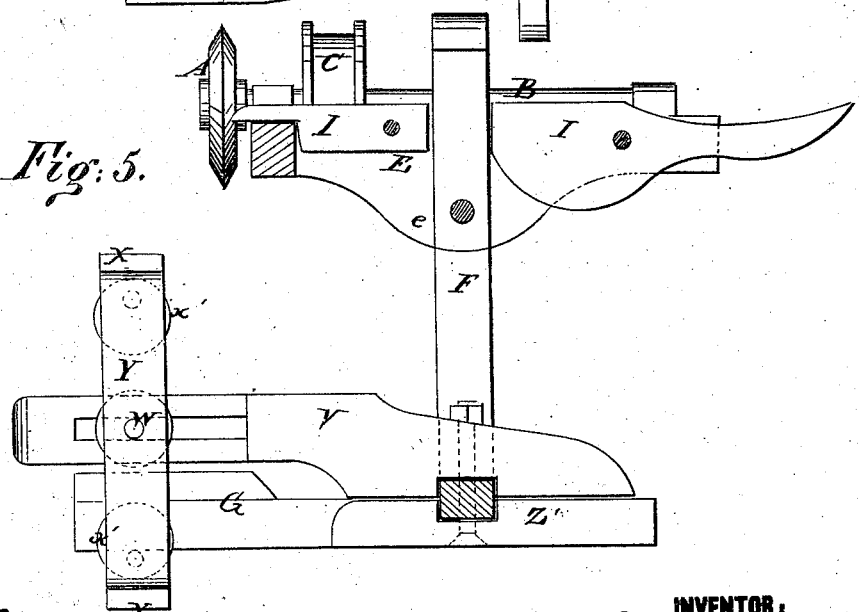

UNITED STATES PATENT OFFICE.

HENRY BAUGHMAN, OF DORN'S GOLD MINE, SOUTH CAROLINA.

IMPROVEMENT IN SAW GUMMERS AND SHARPENERS.

Specification forming part of Letters Patent No. 156,473, dated November 3, 1874; application filed July 18, 1874.

*To all whom it may concern:*

Be it known that I, HENRY BAUGHMAN, of Dorn's Gold Mine, in the county of Abbeville and State of South Carolina, have invented a new and useful Improvement in Saw-Gumming Machines, of which the following is a specification:

Figure 1, Sheet 1, is a top view of my improved saw-gummer arranged for gumming straight saws, parts being broken away to show the construction. Fig. 2, Sheet 1, is a front view of the same, part being broken away to show the construction. Fig. 3, Sheet 1, is a detail side view of the saw-clamp and its attachments. Fig. 4, Sheet 2, is a top view of the machine arranged for gumming circular saws. Fig. 5, Sheet 2, is a detail vertical section of the same, taken through the line $x$ $x$, Fig. 4.

Similar letters of reference indicate corresponding parts.

My invention has for its object to improve the construction of the saw-gummer for which Letters Patent Nos. 135,962 and 145,327 were granted to me February 18, 1873, and December 9, 1873, respectively, so as to make them more convenient in use and more effective in operation.

The invention will first be fully described, and then pointed out in the claims.

A represents the gumming-wheel, which is attached to the end of the shaft B, to which shaft is also attached a pulley, C, for the driving-belt D. The shaft B revolves in bearings in the frame E, to the side bars of which are attached brackets $e$, through which pass the bolts or pins by which the said frame is pivoted to the side bars of the upright frame F, the base-bar of which is detachably secured to a base frame, platform, or floor, G. To the projecting ends of the end bars of the frame E, upon the outer side of the side bar of the frame F, is attached a handle, H, by which the frame E is operated, to bring the gumming-wheel A in contact with and raise it from the teeth of the saw. The movement of the frame E is limited and prevented, as required, by buttons I pivoted to the side bar of said frame, and which strike against the side bar of the frame F, as shown in Figs. 1 and 4. To the base-bar of the upright frame F is bolted a block, J, to the forward part of the upper side of which is pivoted the forward part of the block K, against which the straight saw is clamped to be operated upon. To the lower side of the inner end of the block K is attached a plate, $k^1$, the ends of which project, and have holes formed through them to receive screws, which pass into holes in the block J, to hold the block K securely, and enable its inner end to be inclined to one side and the other, to give a bevel to the saw-teeth. L is a clamp, by which the saw is held against the block K, and which has a rabbet or shoulder formed upon its inner side for the back edge of the saw to rest upon. The clamp L has two inclined slots formed through it, to receive the bolts by which the said clamp is secured to the block K. To the forward bolt of the clamp L is pivoted a lever, M, the end of which is curved or hollowed out upon its upper side, and rests beneath a disk, N, secured to the clamp L. By this construction when one tooth is gummed, and the clamp L allowed to drop down, the inclination of its slots will carry forward the clamp L, and with it the saw. As the clamp L is again raised by the lever M, a tooth of the saw will catch upon the stop O attached to the block K, by which the saw will be held, so that it cannot be carried back by the backward movement of the clamp L, thus bringing the next tooth into position to be operated upon by the gumming-wheel A. The stop O is slotted to receive the screw by which it is secured, so that it may be adjusted according to the size of the saw-teeth. P is a clamp for holding hand-saws while being gummed. The clamp P is made tapering, and with an outwardly-projecting flange upon the outer side of its lower edge, to enter a groove in the inner side of the clamp L at the base or shoulder of its rabbet, to prevent the clamp P from rising upon the clamp L, while leaving it free to move longitudinally. The upper edge of the clamp P is slotted longitudinally, to receive the back edge of a hand-saw, and hold said saw with its toothed edge level. The jaws of the clamp P may be provided with a screw for holding them together upon the saw. In the outer part of the adjustable block K is formed an inclined hole, opening, or passage, $k^2$, leading downward from the space between the said block K and the clamp L, to allow any chips or filings that may fall between said parts to escape. From the pulley C the belt D passes around the guide-pulleys Q, which run loose upon the pin R, which passes through the ends of the top and bottom bars of the frame S, which is bolted in proper position to the frame, platform, or floor G. The pin R also passes through the ends of the top and bottom bars of the frame T, to which are pivoted the guide-pulleys U for the belt D, and which swings upon the pin R, so that it may adjust itself to the direction in which the belt D passes to the driving power.

When the power is taken from below, the upper pulley Q should be placed above, and the lower pulley Q between, the bars of the swing-frame T. When the power is taken from above, the position of the pulleys Q should be reversed.

To adjust the gummer for gumming circular saws, the block J and its attachments are detached and replaced by the bar or block V, the outer part of which is slotted, to receive the pin W, which passes through the eye of the saw, and which may be the saw-mandrel, the said slot enabling the saw to be adjusted according to its diameter. To the pin or mandrel W and slotted block V is attached a block, X, to the face of which, above and below the pin W, are attached two disks, X', against which the saw rests, and against which it is held by the block Y, also placed upon the pin W, and secured by a nut. To the base bar of the frame F, directly below the bar or block V, is secured a block, Z, which serves to set the frame F square.

I describe in this application the swinging frame and its guide-pulley, combined with the adjustable frame and its guide-pulley, for the purpose of rendering other parts more intelligible, but intend to make the same the subject of a subsequent and separate application.

Having thus described my invention, I claim as new and desire to secure by Letters Patent—

1. The flanged and slotted tapering clamp P, in combination with the clamp L and block K, for holding a hand-saw while being operated upon by the gumming-wheel A, substantially as herein shown and described.

2. The opening $k^2$, formed in the block K, for the escape of the filings, substantially as herein shown and described.

HENRY BAUGHMAN.

Witnesses:
L. TUCKER,
M. N. CARTLIDGE.